BOTTLE PACKAGE AND CARRIER

Filed Oct. 8, 1964

INVENTOR.
JON P. BRUNSING
BY
Boykin, Mohler & Foster
ATTORNEYS

INVENTOR.
JON P. BRUNSING
BY
Baykin, Mohler & Foster
ATTORNEYS

INVENTOR.
JON P. BRUNSING
BY
Boyken, Mohler & Foster
ATTORNEYS

United States Patent Office 3,285,410

Patented Nov. 15, 1966

3,285,410
BOTTLE PACKAGE AND CARRIER

Jon P. Brunsing, 345 Golden Gate Ave., Belvedere, Calif.

Filed Oct. 8, 1964, Ser. No. 402,456
10 Claims. (Cl. 206—65)

This invention relates to a carrier for bottles, and has for one of its objects the provision of a simple, rugged, economically made carrier for a plurality of bottles, and which carrier is adapted to securely hold such bottles together to provide a package of bottles that may be safely carried and handled in any position, yet the bottles may be quickly and easily removed therefrom.

It is recognized that bottle carriers from which a plurality of bottles are suspended, are old, and are made of various materials. These carriers, insofar as I am aware, are so constructed as to require complicated and expensive machinery for connecting them to the bottles, and after they are connected to the bottles, the latter swing and knock together at their sides or lower ends while being carried, which is objectionable.

Another object of this invention is the provision of a package of bottles that includes a carrier at their upper ends, which carrier is constructed to releasably hold the bottles together substantially as a unit so that a purchaser may grasp one of the bottles of the package by a hand and pull the package from a shelf without danger of the other bottles breaking away and falling, and causing injury to the person, or breaking and splattering the contents and also scattering broken glass.

A still further object of the invention is the provision of a carrier for a group of upright bottles that are in side-by-side substantially engaging relation, and which carrier is disposed entirely within the vertically projected confines of the outline of such group so that a plurality of such groups may be positioned within a case without spacing the groups, and consequent loss of space, and which carrier is also positioned intermediate to the upper and lower ends of the bottles of the group.

An added object of the invention is the provision of a carrier that is constructed to provide finger openings for carrying a group of bottles secured together by said carrier, which carrier may also provide a cap lifter for removing the caps from the bottles. In this respect, it should be noted that the present invention is adapted for use with bottles closed by the conventional caps that are each crimped over a bead formed around the upper end or mouth of each bottle; hence the employment of the present carrier not only forms a package, and a means for carrying the bottles, but it provides the means for opening the bottles to enable using the contents of the latter thereby eliminating the danger imminent where a user attempts to remove the tightly secured caps by awkward attempts to jerk the cap from the neck, or to knock it off, or to pry it off by means not designed for that purpose.

An added object of the invention is the provision of a carrier or connector for a group of bottles, which carrier is adapted to be positioned on and connected with a group of bottles that are in one or a pair of parallel rows as such bottles are being conveyed in a direction longitudinally of such rows in a standard system without slowing the movement of such bottles or changing their direction of movement.

A still other object of the invention is the provision of a simple means and method for securing the carrier illustrated herein to a group of bottles.

Other objects and advantages will appear in the drawings and in the description.

In the drawings, FIG. 1 is a top plan view of the carrier.

Figures 3, 4, 5, 6:
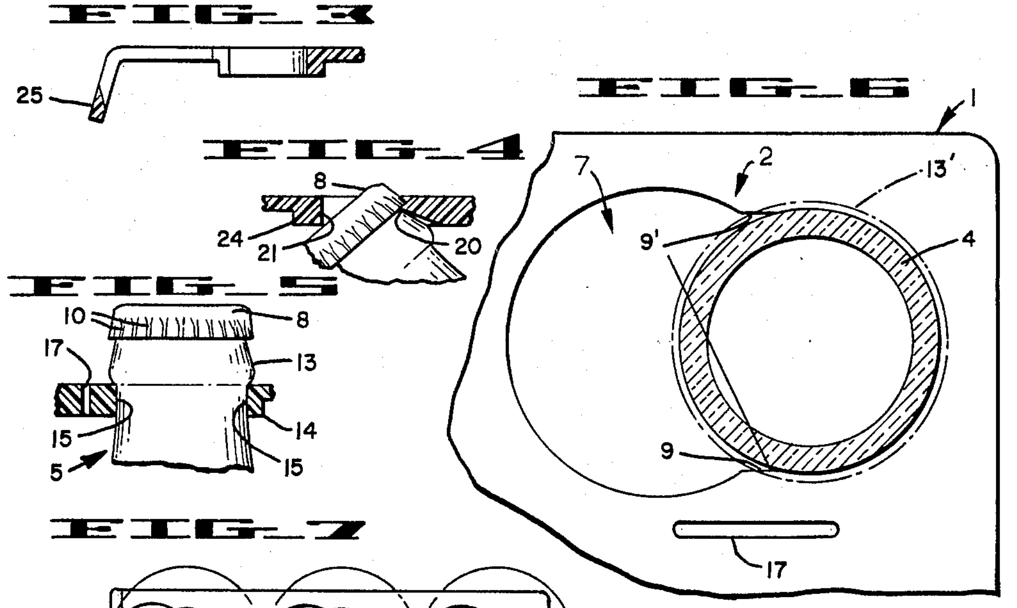
FIG. 3 is a fragmentary cross-sectional view taken along line 3—3 of FIG. 1.
FIG. 4 is a fragmentary cross-sectional view through the cap removing portion of the carrier at line 4—4 of FIG. 1. The view shows a cap on the neck of a bottle in a position to be removed by the carrier, which cap and neck are not shown in FIG. 1.
FIG. 5 is a fragmentary cross-sectional view at line 5—5 of FIG. 1, showing the neck of a bottle when in position in one of the openings.

FIG. 6 in an enlarged, fragmentary, top plan view showing the neck of a bottle in cross section in one of the openings, the dot-dash line indicating the position of the bead on said neck above the section line.

Figure 7:
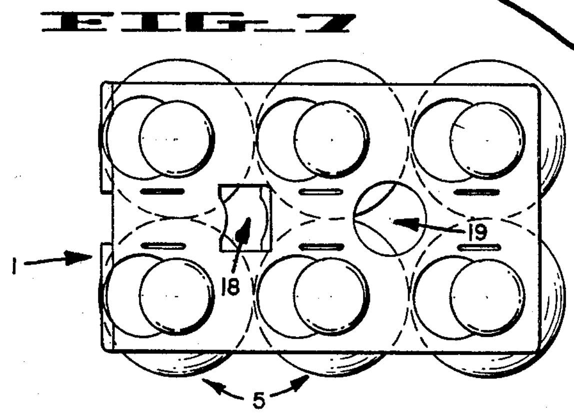

FIG. 7 is a reduced size top plan view of a package of bottles that includes the carrier.

Figures 8, 11, 12:
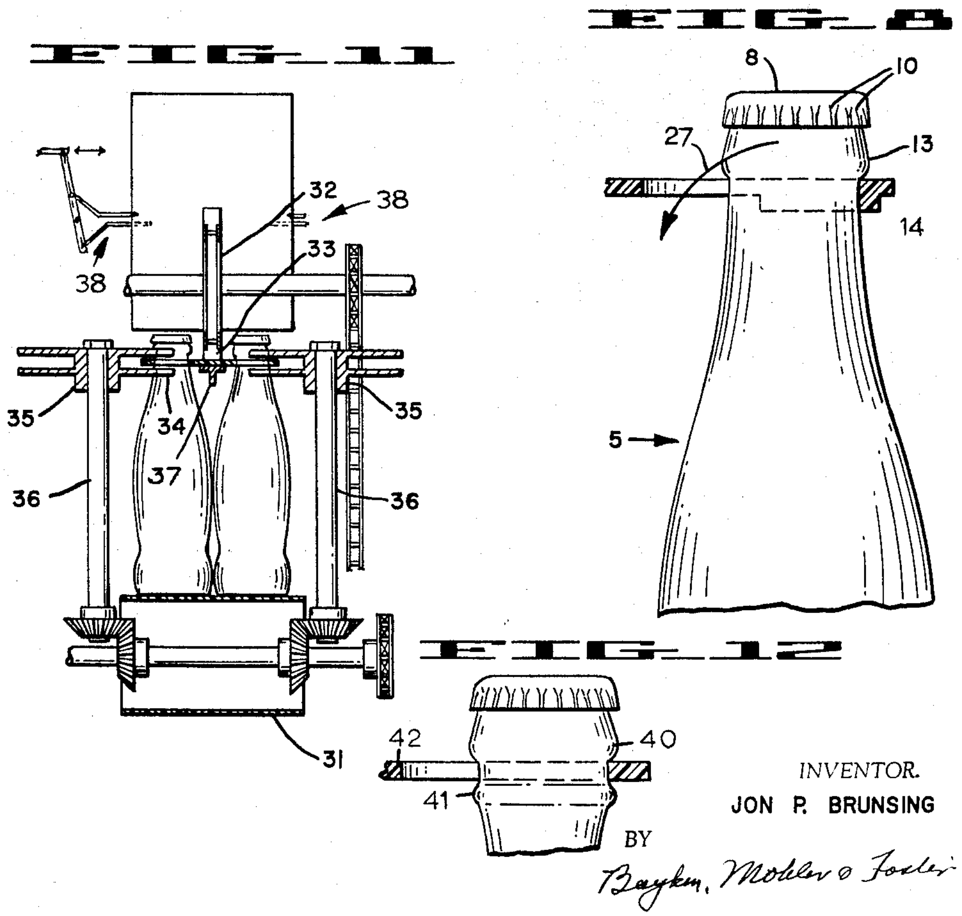

FIG. 8 is an enlarged fragmentary sectional view of the carrier with the upper end of a bottle being held in the opening. The section of the carrier is along line 8—8 of FIG. 1.

Figure 1:
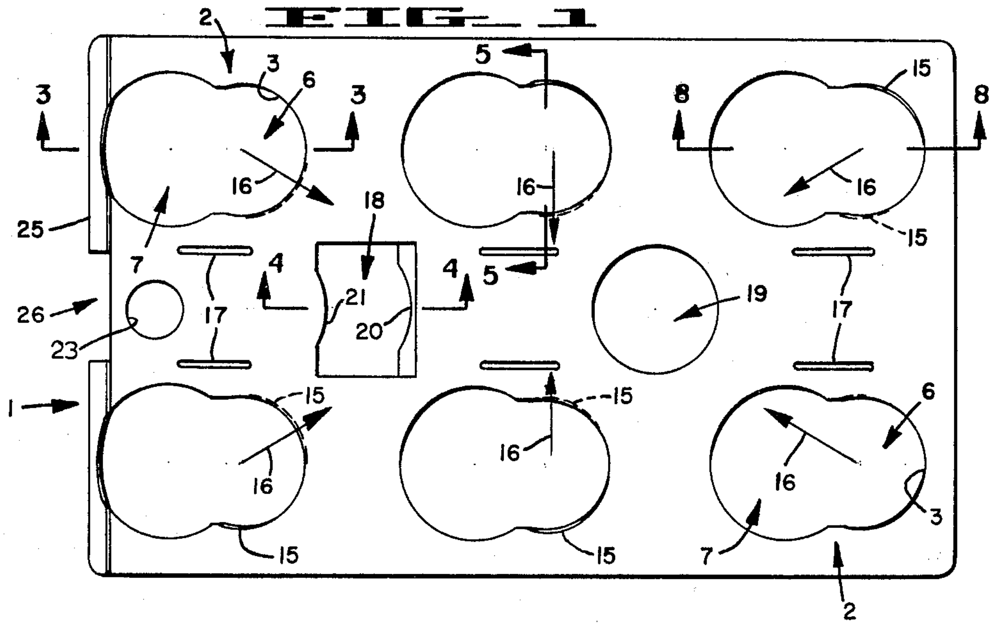
Figures 9, 10:
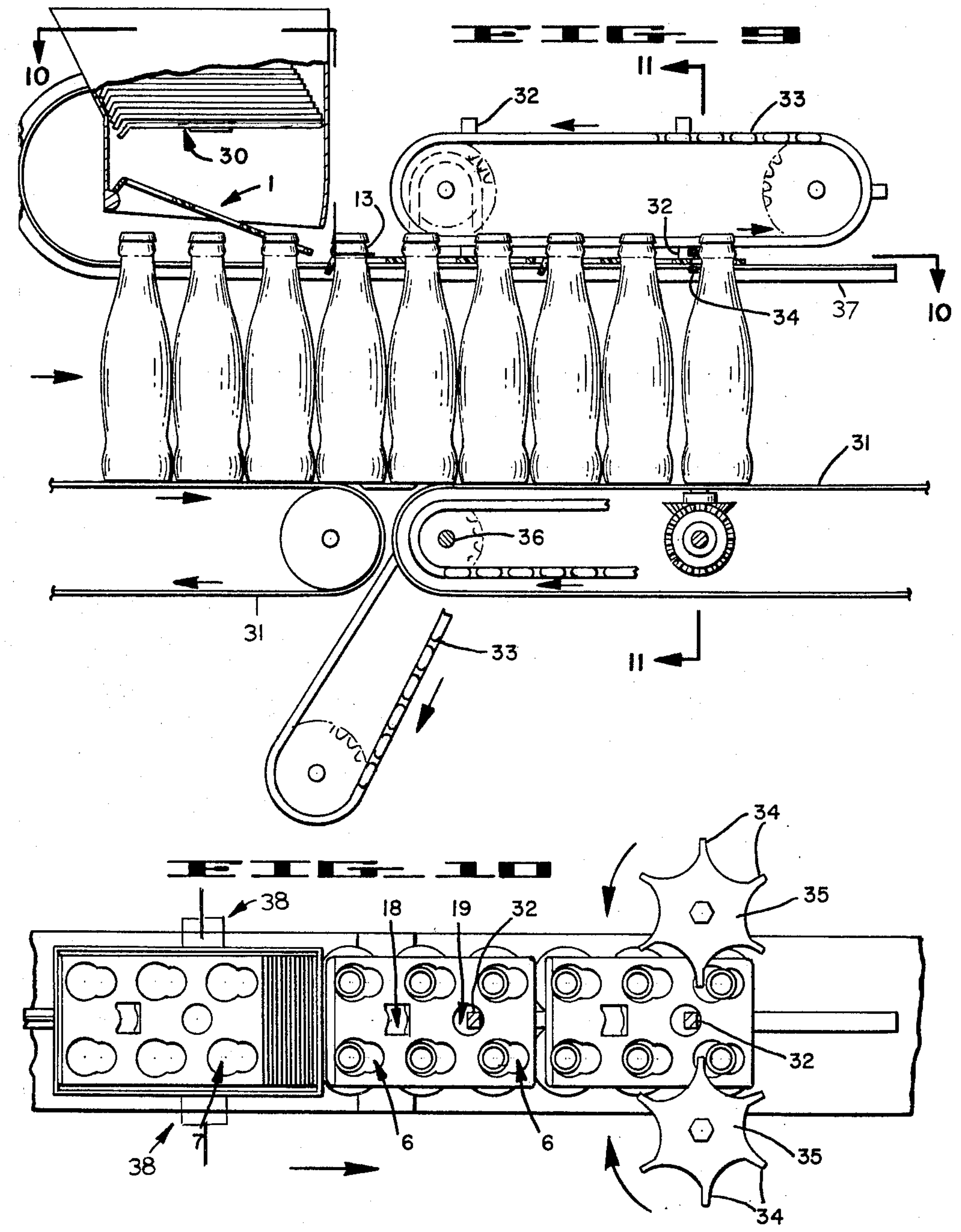

FIG. 9 is a vertical, part sectional and part elevational, view illustrating a machine for placing the carrier of FIG. 1 on a group of bottles.

FIG. 10 is a view of the machine along line 10—10 of FIG. 9.

FIG. 11 is a sectional view taken along line 11—11 of FIG. 9.

FIG. 12 is a fragmentary cross-sectional view showing a slight modification of the holder in combination with a bottle of the type having an incurving neck below the finish.

Figure 13:

FIG. 13 is a fragmentary cross-sectional view showing a structure adapted to substitute for structure shown in FIGS. 1, 5.

In describing the present invention, the words "carrier" and "connector" are generally synonymous, in that the device performs the function of connecting the bottles of a group so the group may be withdrawn from a shelf or refrigerator as a unit and handled as a unit. Also, the device that so connects the bottle may function as a carrier for carrying the group of bottles as a unit and may function as a means of removing the bottle cap.

The aforesaid device preferably comprises a sheet, generally designated 1 of relatively rigid material, such as a medium, high impact, modified polystyrene. One such material is known to the trade under the trade name LUSTREX. Other suitable plastics in the styrene group, such as known to the trade as "A.B.S." may be used. The desired characteristics are toughness, resistance to breakage, and sufficient resiliency to accomplish the desired results. Also the material is one preferably adapted to be molded by the injection molding process.

While the device illustrated in the drawings is for six bottles in two rows of three bottles each, it is obvious that the device may be formed to carry or connect only four bottles, or a plurality of pairs greater than three, or a pair.

Said sheet 1 is formed with a plurality of elongated openings, each generally designated 2, there being one for each bottle, and the said openings are longitudinally aligned along a pair of parallel lines extending lengthwise of the carrier 1, the latter being generally oblong for six bottles. For only two pairs it would be more nearly square.

Figure 2:
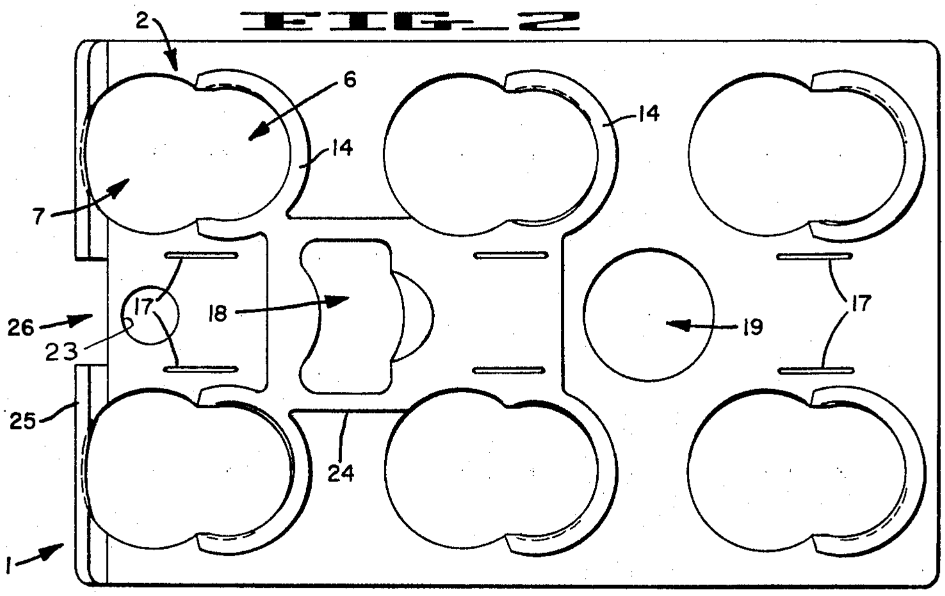
FIG. 2 is a bottom plan view of the carrier.

Each of the openings 2 may be said to generally resemble a keyhole. One of the correspondingly positioned end portions of said openings have circularly extending edges 3 that substantially correspond in diameter to the outer diameter of the neck 4 (FIG. 6) of each bottle 5 to be carried (FIG. 6). This end portion of each opening 2 may be generally designated 6 (FIGS. 1, 2) and the other end portion of each opening is also preferably circular and is generally designated 7. The portion 7 is of sufficient diameter to pass therethrough the neck 4 and cap 8 of each bottle 5 axially of the latter. Said portions 6, 7 of each opening 2 have terminating end edges that connect with the opposite ends of substantially flat parallel short side edges 9 (FIG. 6) that define the opposite sides of a passageway 9' between the portions 6, 7. The distance between said edges 9 of each opening 2 is slightly less than the diameter of the neck 4 of each bottle at the point where the finish of the bottle commences.

The bottles illustrated are conventional, each having a rounded bead at the mouth over which the flanges 10 (FIGS. 5, 8) of the caps 8 are crimped. This bead or ridge is enclosed by each cap; hence is not shown in the drawings, but below each cap and adjacent thereto is a rounded bead 13 (FIG. 5) that projects radially outwardly of the neck, adjoining and above what is sometimes called the "chuck" of the bottle. In any event, the portion of the bottle from and including bead 13 axially outwardly to the mouth is called the "finish" of the bottle.

In the bottles illustrated, the outside diameter of the neck where the finish commences, or just below bead 13 may be approximately one-sixteenth of an inch greater in diameter than the space between edges 9, or the width of the passageway 9' between the portions 6, 7 of each opening. The reason for this will be described later on, as well as the reason for the edges 9, and it may be noted that the length of each of said edges is preferably approximately three-sixteenths of an inch where bottles 5 are conventional beverage bottles.

The spacing between the portions 6 of the adjacent openings 2 is such that the bodies of the bottles at their lower ends will substantially contact each other when the necks of the bottles are in the portions 6 of openings 2.

The material of the sheet 1 is sufficiently elastic or resilient so to that the neck of each bottle will be sprung from the portion 7 of each opening 2 past edges 9 of the passageway 9' into the portion 6 of each opening upon lateral movement of each bottle from portion 7 into portion 6 when the sheet 1 is at the level of the commencement of the finish of each neck 4 or just below the bead 13. As will later be explained, it is preferable that adjacent bottles of pairs thereof in an adjacent pair of rows be moved longitudinally of said rows at a predetermined rate of speed while each sheet is moved at a different rate at a point along the rows in order to cause the necessary relative movement between the sheet and the bottles to cause the necks to snap through and past the passageway 9' defined by edges 9 and into the portions 6 of each opening 2, after which the necks will be firmly, but releasably, held in said portions 6 so there will be substantially no axial or radial movement of the bottles relative to the sheet 1 when the group of bottles is carried by the carrier or handled as a package.

Referring to the underside of each sheet 1, it is seen that a reinforcing rib or ridge 14 may be provided, which rib is integral with each sheet along the circular edge 3 of each opening. The sheet 1 may be approximately one-sixteenth of an inch in thickness, as may be the thickness of each ridge 14, and the surfaces of the edges 3 are coincidental with the inner surfaces of the ridges 14.

It has been mentioned that the lower ends of the bottles should preferably be held in engagement with each other. This is to prevent rattle and possible injury and contributes to forming a rigid package. In any event, the bottles should not swing relative to the carrier or sheet 1, and while they are normally held firmly by the necks, the generally opposite portions 15 (FIG. 5) of the edges 3 adjacent to the passageway 9' may be correspondingly slanted slightly relative to vertical, when the sheet 1 is horizontal, so that the bottles held by their necks in said openings will be yieldably held in contact with each other at their lower ends.

The slant of edges 15 are respectively arranged so that the lower ends of the bottles will be yieldably urged into engagement with each other in directions toward the central vertical axis of the sheet when the latter is horizontal and the bottles depend therefrom. The arrows 16 in FIG. 1 indicate the directions of the forces. Obviously the edges 15 along one row of openings are slanted oppositely to those of the other row, and the inclination of one of the edges 15 of each of the end openings of the two rows may be positioned farther around edge 3 than in the case of the central openings 2 so as to urge the lower ends of the bottles along the obliquely directed arrows 16 relative to the lengths of the rows and generally toward the aforesaid central vertical axis.

It should be noted that the bottles normally will be substantially in engagement with each other, but the above structure provides means for yieldably holding them in such engagement.

The force required to move the necks of the respective bottles through passageways 9' is substantial, and in order to reduce the force required to effect such movement, one of the sides of each passageway 9' may be made more resilient than the other by forming an elongated slot 17 along the inner edge 9 of each passageway, said inner edge being preferably the one nearest the center of the sheet, although there may be some added resiliency at the other edge due to the proximity of the other edge to the edge of the sheet, and said slots may extend longitudinally of the sheet. Thus, said slots provide means for making one side of the passageway between the portions 6, 7 of each opening 2 more resilient than the other and the degree of resistance may depend upon the closeness of the slots to the passageway. Normally it may be such that approximately a six to ten pound pull is required to move the neck of the bottle through each passageway, whereas approximately a fifteen to twenty pound pull would be required were it not for the slots.

A pair of openings 18, 19 formed in said sheet are respectively equally spaced from the openings 2 of each end pair thereof in the two rows, and are in the areas between each of said end pairs and the central pair of openings 2. These openings provide finger holes through which the fingers of a hand may extend for lifting the carrier and bottles held thereby and suspended therebelow.

Opening 19 may be circular, while opening 18 has two opposite edges 20, 21 extending transversely of the length of the carrier, the edge 21 being tapered to provide a relatively sharp free edge facing into the opening 18 which edge is adapted to engage under the flange 10 of the cap 8 of a bottle when such cap on a bottle is angularly positioned in the opening, as seen in FIG. 4, which in such position, the top of cap will engage the underside of the sheet 1 at the opposite edge 21 so the cap may be pried off in the conventional manner upon swinging the major length of the sheet in which opening 19 is positioned, in an upward direction while holding the bottle.

The sheet 1 includes a reinforcement 24 (FIGS. 2, 4) or additional thickness of material around the opening 18 and which reinforcement may extend substantially to opening 19 and is of substantially the same thickness as that of ridges 14. This insures against breakage or undesirable bending of the carrier while removing the caps.

It is highly important that the outline of the carrier or sheet 1 come within the upwardly projected outline of the group of bottles carried by the sheet, FIG. 7 shows the outline of sheet 1 with reference to the outside outline of the group of bottles.

In order to both insure the outline of sheet 1 coming well within the upwardly projected outline of the group of bottles, the marginal portion 25 of the sheet 1 may be extended slantingly downwardly at the end of the sheet that will be adjacent to the larger diameter portions 7 of the end openings 2 of the rows. This to a great extent depends upon the diameter of the bottles. This angularly, downwardly extending end portion on each sheet both reinforces the sheet and brings the end edge of the sheet along said marginal portion well within upwardly projected outline of the group of bottles. This flange or marginal portion 25 may be interrupted as at 26 for use in the machine for applying the sheet to the bottles. Thus, the bottles in a case containing a plurality of package, each formed by a carrier and the bottles connected therewith, may be in engagement with each other.

Referring again to FIG. 6 in which the side edges 9 of passageway 9' are shown, the provision of said side edges 9 insures against accidental separation of the bottles from the carrier where a purchaser may pull a package from a shelf in a refrigerator or elsewhere by grasping one of the end bottles.

The length of said edges 9 is such that the ends of the latter remote from the neck 4 will be beyond the bead 13, the outside outline of which is indicated in dot-dash line 13' in FIG. 6.

By this arrangement, in order to remove each bottle from the portion 6 of each opening 2, the lower end of the body of the bottle is swung laterally relative to the carrier to rotate or move the cap 8 through the portion 7 of each opening 2 as indicated by the arrow 27 in FIG. 8. However, before the bead 13 can so move through portion 7 it must move to a position over and past the ends of edges 3 that are remote from the neck, and the resistance to such movement is sufficient to prevent the accidental separation of the bottles from the carrier without objectionably adding to the effort required to intentially remove the bottles.

The use of a plastic carrier as distinguished from metal or the like, is its freedom from sharp edges, corrosion and distortion, and the plastic is relatively soft as compared with metal. Also, by injection molding, the carriers may be formed accurately and fast with no waste material.

By the structure shown, the carrier and the bottles form a unitary, rigid package. The sides of the bottles, including the necks to the points where the carrier engages the necks are fully exposed; hence there is no obstruction to rapid cooling of the bottles by circulation of air between them, nor is there any cardboard or the like to become weakened, or impaired due to condensation of moisture on the bottles or the presence of moisture.

In forming each package of bottles, a sheet 1 may be lowered or dropped onto the leading multiple of bottles that is to constitute a package (FIG. 9), which bottles are in a pair of parallel rows in substantial engagement with each other and are moving in one direction longitudinally of the rows.

Then the adjacent pairs of opposed bottles in the two rows are moved longitudinally of the rows from openings 7 into openings 6.

One method of doing this is illustrated by the apparatus shown in FIGS. 9–11. In FIG. 9 a lower sheet 1 from a stack 30 that extends upwardly over the rows of bottles is dropped from the stack over each successive multiple of adjacent bottles in said rows for forming each package so that the leading pair of bottles in each multiple will draw the sheet from the magazine containing rack 30. Conveyors 31 support said bottles upright in a pair of rows, and carry said bottles in one direction at a uniform rate of speed. After a sheet 1 is positioned on the bottles of the desired multiple thereof with the sheet supported at the level just below bead 13, said sheet will be moved with the bottles in said one direction. By engaging the sheet 1 through one or the other of holes 18 or 19 or both, or through another opening 23 by a projection or projections 32 on the lower run of an endless sprocket chain 33 or the equivalent, and positively actuating said chain to move said carrier or sheet 1 at the same rate as said conveyor, it is seen that the bottles may be engaged at the necks thereof and moved relative to the sheet from openings 7 into openings 6 through passageways 9'. In other words, by holding the sheet 1 against accelerated movement, and accelerating the movement of the bottles on conveyor 31, there will be a relative movement between the sheet and the bottles so that the necks of the bottles will be moved into portions 6 of openings 2.

Where a single opening 23 is employed, it is preferably formed in the trailing marginal portion of the sheet, since the force of urging the bottles into the portions 6 of the openings is due to holding the sheet 1 against acceleration with the bottle necks.

The movement of the necks can be accomplished by simultaneously engaging the adjacent pairs of bottles by fingers 34 on horizontal rotary modified star wheels 35 which fingers may be in pairs on vertical driven shafts 36 so positioned to straddle the sheet 1 (FIG. 11) along opposite longitudinally extending edges of each sheet. The conveyor 31 and wheels 35 are synchronized, so that the successive pairs of bottles in the two rows will be successively moved into the openings 6 (FIG. 10) as said pairs are moved by the wheels therepast. The path of travel of fingers 34 being greater where the fingers move over the conveyor than the distance the conveyor normally would carry the bottles during the same period of time, the bottles will be moved forwardly on the conveyor.

While it is possible to move all of the bottles of each desired multiple thereof from portions 7 into portions 6 of the openings 2, it is preferable that successive pairs be so moved since substantial force is required to move each bottle, and less strain is placed on the carrier or member 32 where only a pair is moved at a time.

It is believed that the apparatus for accomplishing the above method as seen in FIGS. 9–11 is clear. Conveyor 31 is standard and is power driven as is the endless chain 33 and shafts 36.

In some bottles, such as the stubby type for malt beverages, the carrier or sheet 1 is positioned just below the cap, such as used on the bottle 4, since the head 13 is absent. The method of forming the package is the same, and the same type of package is formed. However, the carrier will engage the flanges on the cap instead of the bead, and in such instances the length of the edges 9 of the passageway 9' may be reduced, if desired, so there will be no danger of removing the cap when the bottles are removed from the sheet.

The provision of slots 17 enables the carrier to be used several times. If the carrier is a throw-away item, said slots may be eliminated. Thus the carrier may be modified to meet any desired situation without altering its manner of operation.

In FIGS. 9–11, a central horizontal strip 37 may be provided for supporting the sheets 1 at the desired level when the multiples of bottles 5 are moved by conveyors 31. Any suitable and conventional sheet releasing means generally indicated at 38 may be synchronized with conveyors 15 for successively releasing the sheet 1 in the magazine. Star wheels, reciprocating supports and other such means, not shown, are commonly used.

The interruption 26 (FIG. 1) in sheet 1 is to enable the sheet to be supported horizontally on the slide or guide 37.

It may be noted that as soon as the center of the neck of each bottle passes the passageway 9' between portions 6, 7 in openings 2, the necks of the bottles will snap into portions 2, so it is merely necessary to move the necks a relatively short distance.

FIG. 12 illustrates a situation where the neck below the finish, or bead 40 (which corresponds to bead 13) curves inwardly. In such a case, the bottle obviously must be formed with another bead 41 so that the holder or sheet 42 will not slip downwardly, but will be tightly held against downward movement. In the neck of bottle 5 (FIG. 5) the neck curves outwardly below the bead 13.

The sheet 42 indicated in FIG. 12 is the same as the sheet, 1, 2 except for the fact there is no reinforcement such as indicated at 14 (FIG. 2) below the sheet.

FIG. 13 shows a modification that has been found to provide more resiliency to the side of each row of openings where the slots 17 are positioned. In this view, the slots are eliminated and the sheet is molded to provide a V-shaped 43 channel alongside the openings extending longitudinally of the sheet. The sheet is otherwise the same as in FIGS. 1, 2, except that the extra reinforcing material is not indicated. This may or may not be used, as desired.

It is to be understood that the slots 17 may be closed at their ends or may be slanted relative to the longitudinal axis of the sheet so that the ends adjacent to the enlarged portions 7 may open into the latter at a point adjacent to but spaced from the flat surface 9' adjacent thereto.

The use of the V channels 43 would, of course, eliminate the necessity, in a mold, of providing a relatively thin blade or the like for forming the slots 17, and while the material between the V channels and the openings would insure added resiliency, the channel would require more material.

It is to be understood that the specific details of the structure are by way of illustration and are not necessarily restrictive of the invention. The structure employed is, to a great extent, dependent upon whether the connector is intended to be reused, and the structure of the bottles, etc. The appended claims are intended to cover any modifications, changes and additions that may come within the scope thereof.

I claim:

1. A connector for bottles of the type having necks of outside circular cross-sectional contour and an annular radially outwardly projecting enlargement at the upper end of each neck, comprising:

(a) a horizontal, rigid sheet of relatively resilient material formed with a plurality of keyhole openings respectively providing large and small opposite end portions and a restrictive passageway communicating between them;

(b) said passageway having opposed sides spaced apart a distance slightly less than the diameter of said small end portion and the outside diameter of the neck of each bottle at a point below and adjacent said annular enlargement;

(c) said small end portion of each opening having edges terminating at said passageway adapted to tightly engage more than one half of the outer surface of said neck circumferentially thereof at said point;

(d) said large end portion of each opening having edges terminating at said passageway and said large end portion being sufficiently large to freely pass said enlargement on each neck therethrough, axially of said bottle and insufficient to pass the body of said bottle below said neck whereby said horizontal sheet may be positioned over a plurality of said bottles when the latter are upright with said necks thereof extending through said large end portions of said openings;

(e) the material of said sheet being sufficiently resilient at each passageway to be flexed and pass the neck of each of said bottles at said point laterally from said large portion into said small portion of each opening whereby such neck will be yieldably held in said small portion by said material at said passageway.

2. A connector as defined in claim 1, (f) said openings being disposed in a pair of parallel rows with said small portions of said openings being at correspondingly positioned ends of the latter and said end portions of said openings being in alignment in said rows;

(g) said small portions of the openings in said rows being equally spaced from each other in each of said rows and in each of said pair of rows for suspending such bottles from said sheet in substantial engagement with each other below said sheet;

(h) a pair of spaced finger openings formed in said sheet between said rows for insertion of two fingers of a hand therethrough for carrying said sheet and bottles adapted to be suspended therefrom.

3. In a connector as defined in claim 2, (i) means on each connector at each of said small portions of said openings for yieldably holding the lower portions of said bottles suspended from said horizontal sheet when said horizontal sheet is elevated with the necks of said bottles in said small portions of said openings.

4. In a connector as defined in claim 1, (j) each of said passageways having substantially flat, parallel, opposed sides to provide a predetermined increased resistance to movement of the enlargement on each bottle at the upper end of said neck, when said neck is in said small portion of said opening, through said passageway and into said large portion of said opening under a force applied to the lower portion of each bottle for swinging the latter about a horizontal axis extending through the opposite sides of each passageway.

5. A carrier for bottles and the like of the type having necks of outside circular cross-sectional contour with a cap releasably secured over this upper end of each neck projecting radially outwardly thereof, comprising, (a) a horizontal, relatively rigid sheet of relatively resilient material formed with a plurality of keyhole-shaped openings, each providing large and small opposite end portions and a restrictive passageway communicating between them, said large end portion being of a size to relatively freely pass the neck of one of said bottles, including the cap thereon, therethrough in a direction axially of such neck and the small end portion of each opening being of a size to snugly circumferentially engage more than one-half of such neck in encircling relation at a point adjacent to and below said cap, and said passageway being of a width slightly less than the diameter of said small end portion and said neck to pass said neck at said point in a direction laterally thereof from said large portion of each opening into said small end portion only under resilient resistance from said material at said passageway whereby said neck will be yieldably held in said small end portion when forced through said passageway into said small end portion;

(b) a plurality of other openings than said keyhole openings formed in said sheet spaced from said keyhole openings, said other openings including a pair thereof adapted for insertion of a pair of fingers of a hand therethrough from above for manually carrying said sheet and bottles suspended therefrom, as a unit, when the necks of such bottles are in said small end portions of said keyhole openings;

(c) one of said plurality of other openings having one edge thereof adapted to engage below an edge of a cap on each of such bottles when the opposite edge of the last mentioned opening extends over such cap for prying such cap from a bottle when the bottles are removed from said carrier.

6. A carrier for a group of upright bottles substantially in engagement with each other in a pair of parallel horizontally extending rows in side by side relation, and which bottles are of the type having necks of outside circular cross sectional contours each of which has an annular radially outwardly projecting enlargement adjacent to its upper end, comprising (a) a substantially horizontal relatively rigid sheet of relatively resilient material formed with a plurality of keyhole-shaped openings, each providing large and small opposite end portions and a restrictive passageway communicating between them, said large end portion being of a size to relatively freely pass the neck of each of such bottles therethrough axially of the latter, including the enlargement thereon, and the small end portion of each opening being of a size and outline to snugly engage more than one-half of such neck in encircling relation at a point below and adjacent to said enlargement; the opposite sides of said passageway being spaced apart a distance less than the diameter of said small end portion and the neck on each bottle at said point to pass each neck laterally through such passageway only against the resilient resistance from the material at said opposite sides whereby said neck will be yieldably held in said small portion of each keyhole opening by the material at said passageway;

(b) the material at the closed opposite ends of each keyhole opening connecting the sides of each keyhole opening for holding the sides of said small portion of each keyhole opening extending to said passageway in tight engagement with the neck of a bottle when said neck is in said small end portion; and the sides of said large portions of said keyhole openings being adapted to support said sheet horizontal on a group of upright bottles upon such sheet being deposited on the bottles of such group when their necks extend through said large end portions of said keyhole openings prior to relative lateral movement between said sheet and such bottles for positioning said necks of the bottles of the group into said small portions.

7. In a carrier as defined in claim 6, (c) a depending flange integral with said sheet along the edge of each of said small portions of said keyhole openings and a portion of each flange spaced below the level of the upper surface of said sheet offset into said small portion of each opening relative to the portion of each small portion at said level for engaging one lateral side of the neck of a bottle adapted to be positioned within each of said small portions for urging the portions of the bottles suspended below said sheet toward and into engagement with each other independently of gravity when said horizontal sheet is elevated and when said necks of said bottles are in said small portions of said keyhole openings.

8. In a carrier as defined in claim 6, (c) said sheet being substantially rectangular in outline having two opposite ends, and said rows of openings extending longitudinally thereof between said ends with said small end portions of said openings being on longitudinal alignment with said rows;

(d) said large portions of the openings in each row being at one of the corresponding ends of the openings of each row whereby said large portions of the end openings at one of the corresponding ends of said rows will be adjacent to one end of said sheet, and the small end portions of the other end openings of said rows will be adjacent to the other end of said sheet;

(e) the marginal portion of said sheet along said one end of said sheet being at an angle relative to horizontal for positioning the edge of said sheet along said one end within the confines of the upwardly projected outer outline of the groups of bottles when the necks of said bottles are held within the smaller end portions of said openings.

9. A package comprising (a) a group of upright bottles of corresponding shape and size, each having an upwardly extending neck at its upper end of substantially circular cross-sectional contour and an annular radially outwardly projecting enlargement on the upper end of each neck;

(b) a horizontal, relatively rigid sheet disposed on a horizontal plane and formed with a row of equally spaced generally keyhole-shaped openings each providing a large and a small opposite end portions and a restrictive passageway communicating between them;

(c) a neck of one of said bottles being positioned within each of the smaller end portions of each keyhole opening and the edge of each of said smaller end portions extending around each neck at a point below and adjacent to the enlargement therein for a distance more than one half the circumference of each neck, and in snug engagement with each neck for holding each bottle substantially against swinging relative to each other when said sheet is lifted to carry said bottles;

(d) the width of said passageway being less than the diameter of said small end portion and each bottle at said point and the material of said sheet at said passageway being sufficiently resilient to flex and enable forceable movement of each neck laterally through said passageway and into the large end portion of each keyhole opening upon manual swinging of the portion of each bottle below said sheet about a horizontal axis extending through opposite sides of said passageway;

(e) said large end portion of each keyhole opening being larger than the outside diameter of said annular enlargement for movement of said neck axially thereof out of each of said large end portions upon each neck being within one of said large end portions;

(f) said sheet being in a horizontal plane at a right angle to the vertical axis of said necks when said necks are held in said small end portions.

10. In a package as defined in claim 9, (g) said sheet having a second row of keyhole openings parallel with and alongside said first mentioned row, and identical to the keyhole openings of said first mentioned row; and (h) a second row of bottles of the same structure as the bottles having their necks held in said first mentioned row of keyhole openings, the bottles of said second row having their necks held in the small end portions of the keyhole openings of said second row;

(i) the outer outline of said sheet being within the upwardly projected outermost outline of the group of bottles including both rows thereof, and the outer axis of said bottles of said groups being at a right angle to the keyhole plane of said sheet;

(j) said bottles each having a substantially circular cap on its uppermost end of less diameter than that of said large end portion of each keyhole opening, and (k) means spaced within the outside outline of said sheet integral therewith and spaced from said keyhole openings adapted to separately engage each of said caps when said bottles are removed from said sheet for prying each cap from each bottle.

References Cited by the Examiner

UNITED STATES PATENTS

| | | | |
|---|---|---|---|
| 2,320,440 | 6/1943 | Kruea et al. | |
| 2,427,838 | 9/1947 | Cox | 294—87.28 |
| 2,467,106 | 4/1949 | Adkins | 220—106 |
| 2,508,945 | 5/1950 | Heuer | 211—75 |
| 2,964,348 | 12/1960 | Ingham | 294—87.28 |

FOREIGN PATENTS

| | | |
|---|---|---|
| 1,179,826 | 12/1958 | France. |

LOUIS G. MANCENE, *Primary Examiner.*